(12) United States Patent
Oh et al.

(10) Patent No.: US 9,876,237 B2
(45) Date of Patent: Jan. 23, 2018

(54) FUEL CELL SEPARATOR AND FUEL CELL STACK AND REACTANT GAS CONTROL METHOD THEREOF

(71) Applicant: DOOSAN CORPORATION, Seoul (KR)

(72) Inventors: Sung-Jin Oh, Seoul (KR); Kyoung-Hwang Lee, Gwangju (KR); Seung-Ho Baek, Goori (KR); Sung-Hoon Lee, Seoul (KR); Il-Tae Park, Seongnam (KR); Byung-Sun Hong, Seongnam (KR); Mee-Nam Shinn, Yongin (KR)

(73) Assignee: DOOSAN CORPORATION, Seoul (KR)

( * ) Notice: Subject to any disclaimer, the term of this patent is extended or adjusted under 35 U.S.C. 154(b) by 0 days.

(21) Appl. No.: 15/067,460

(22) Filed: Mar. 11, 2016

(65) Prior Publication Data
US 2016/0197361 A1    Jul. 7, 2016

Related U.S. Application Data

(62) Division of application No. 12/067,086, filed as application No. PCT/KR2007/002520 on May 23, 2007, now Pat. No. 9,343,756.

(30) Foreign Application Priority Data

Aug. 24, 2006  (KR) .................. 10-2006-0080442

(51) Int. Cl.
*H01M 8/0263*  (2016.01)
*H01M 8/2484*  (2016.01)
(Continued)

(52) U.S. Cl.
CPC ....... *H01M 8/0263* (2013.01); *H01M 8/0258* (2013.01); *H01M 8/0267* (2013.01);
(Continued)

(58) Field of Classification Search
None
See application file for complete search history.

(56) References Cited

U.S. PATENT DOCUMENTS

2002/0146610 A1 * 10/2002 Hayashi ................. H01M 8/02
429/429

* cited by examiner

*Primary Examiner* — Daniel Gatewood
(74) *Attorney, Agent, or Firm* — Lex IP Meister, PLLC

(57) ABSTRACT

A fuel cell separator, a fuel cell stack having the fuel cell separator, and a reactant gas control method of the fuel cell stack are provided. That is, even when the fuel cell stack operates under the low load operation condition, a reactant gas is supplied to the reactant gas passages of the fuel cell separator, and thus, the length of the passage can be shortened by 50% as compared with the prior art having only one reactant gas passage. Therefore, the reactant gas can be effectively supplied without experiencing pressure loss. Further, in the high load operation of the fuel cell stack, the reactant gas is introduced into the first reactant gas passage of the fuel cell separator and utilized in half of the whole electrode area. Subsequently, the reactant gas is introduced into the second reactant gas passage and utilized in the remaining half of the electrode area. The flow rate of the reactant gas flowing along the passage channels is increased by two times, even when the reactant gas utilizing rate is identical as compared with the reactant gas flow in the low load operation. As a result, the moisture existing in the passage channels can be more effectively discharged and the flooding phenomenon occurring in the high load operation can be prevented. By controlling the reactant gas supply in accordance with an operation condition of the fuel cell stack (Continued)

without experiencing pressure loss and deterioration of the utilizing rate, the flooding phenomenon and concentration polarization phenomenon that occur in the fuel cell stack can be prevented.

5 Claims, 9 Drawing Sheets

(51) Int. Cl.
| | |
|---|---|
| *H01M 8/0258* | (2016.01) |
| *H01M 8/0267* | (2016.01) |
| *H01M 8/04029* | (2016.01) |
| *H01M 8/04007* | (2016.01) |
| *H01M 8/04082* | (2016.01) |
| *H01M 8/2485* | (2016.01) |
| *H01M 8/2457* | (2016.01) |
| *H01M 8/2483* | (2016.01) |
| *H01M 8/04089* | (2016.01) |
| *H01M 8/04492* | (2016.01) |
| *H01M 8/04664* | (2016.01) |
| *H01M 8/04746* | (2016.01) |
| *H01M 8/1004* | (2016.01) |
| *H01M 8/1039* | (2016.01) |
| *H01M 8/241* | (2016.01) |
| *H01M 8/1018* | (2016.01) |

(52) U.S. Cl.
CPC ... *H01M 8/04029* (2013.01); *H01M 8/04067* (2013.01); *H01M 8/04089* (2013.01); *H01M 8/04201* (2013.01); *H01M 8/04529* (2013.01); *H01M 8/04679* (2013.01); *H01M 8/04753* (2013.01); *H01M 8/1004* (2013.01); *H01M 8/1039* (2013.01); *H01M 8/241* (2013.01); *H01M 8/2457* (2016.02); *H01M 8/2483* (2016.02); *H01M 8/2484* (2016.02); *H01M 8/2485* (2013.01); *H01M 2008/1095* (2013.01); *H01M 2300/0082* (2013.01); *Y02E 60/50* (2013.01)

FUEL CELL SEPARATOR AND FUEL CELL STACK AND REACTANT GAS CONTROL METHOD THEREOF

CROSS-REFERENCE TO RELATED APPLICATION

This application is a Divisional application of U.S. patent application Ser. No. 12/067,086 filed on Mar. 17, 2008, which is a National Stage application of PCT/KR2007/002520 filed on May 23, 2007, which claims priority to Korean Patent Application No. 10-2006-0080442 filed on Aug. 24, 2006, which is incorporated herein by reference.

TECHNICAL FIELD

The present invention relates to a fuel cell stack using a proton exchange membrane fuel cell (PEMFC). More particularly, the present invention relates to a fuel cell separator that can maintain a high reactant gas utilizing rate and effectively control water generated by an electrochemical reaction even when an operation condition varies. The present invention further relates to a fuel cell stack having the fuel cell separator, and a reactant gas control method of the fuel cell stack.

BACKGROUND ART

A PEMFC uses a proton exchange membrane having a hydrogen ion exchange property as an electrolyte membrane. The PEMFC includes a pair of electrodes formed on opposite surfaces of the proton exchange membrane and a separator. The PEMFC generates electricity and heat through an electrochemical reaction between a fuel gas containing hydrogen and air containing oxygen. The PEMFC has an excellent output property and a quick start capability and can be operated at a relatively low temperature. Therefore, the PEMFC has been widely used in various applications such as a portable power source, an automotive power source, and a home cogeneration plant.

The electrodes used for the PEMFC include a catalyst layer containing a supported metal catalyst, such as platinum group metal, and a diffusion layer formed on an outer surface of the catalyst layer and having breathable and electron conduction properties. The diffusion layer is generally formed of a carbon paper or a carbon non-woven fabric. The assembly of the proton exchange membrane and the electrodes formed on opposite surfaces of the proton exchange membrane is referred to as "a membrane-electrode assembly (MEA)". A conductive separator is installed on an outer side of the MEA to mechanically fix the electrodes and electrically interconnect adjacent MEAs. The assembly of the conductive separator, the proton exchange membrane, and the electrodes is referred to as "a unit cell".

A fluid passage is formed on the separator contacting the MEA to supply a reactant gas to an electrode surface and to deliver surplus gas and a reaction by-product. The fluid passage may be separately prepared and installed on the separator. However, the fluid passage is generally provided in the form of a groove shape on a surface of the separator. Particularly, cathode and anode separation plates of the fuel cell separator require electric conduction, gas-tightness, and corrosion-resistance characteristics. Therefore, in order to form the groove, a method that forms the groove by cutting a resin-impregnated graphite plate, a method that forms the groove by compression-forming carbon-compound powders, or a method that forms the groove by pressing a metal plate and coating a corrosion-resistance material on the metal plate has been used.

Further, the PEMFC includes a cooling unit along which a coolant flows and which is installed for one through three unit cells to dissipate heat generated by the operation thereof. The cooling unit includes a fuel gas separation plate having a first surface provided with a fuel gas passage and a second surface provided with a coolant passage, and an oxidizing gas separation plate having a first surface provided with an oxidizing gas passage and a second surface provided with a coolant passage. The fuel gas separation plate is assembled with the oxidizing gas separation plate such that the coolant passage surface (the second surface) of the fuel gas separation plate contacts the coolant passage surface (the second surface) of the oxidizing gas separation plate. Alternatively, the cooling unit may include a fuel gas separation plate having a first surface provided with a fuel gas passage and a second surface (an even surface) that is not provided with any passage, and an oxidizing gas separation plate having a first surface provided with an oxidizing gas passage and a second surface (a coolant passage surface) provided with a coolant passage. The fuel gas separation plate is assembled with the oxidizing gas separation plate such that the even surface (the second surface) of the fuel gas separation plate contacts the coolant passage surface (the second surface) of the oxidizing gas separation plate.

The separation plate of the PEMFC is provided with at least two through holes for each of the fuel gas, the oxidizing gas, and the coolant. Then, by connecting the inlet and outlet of the gas passage to the through holes, the reactant gas or coolant is supplied to the corresponding passage through one of the through holes and the surplus gas and reaction by-product or coolant is discharged through another one of the through holes.

In the PEMFC, a plurality of the separation plates are stacked with one another and thus the through holes of the separation plates form a single manifold. This is referred to as "an internal manifold type". Instead of forming the through holes in the separator, a pipe for dispensing the gas or other structures may be installed on an outer surface of the separator. This is referred to as "an external manifold type".

As described above, the conventional PEMFC includes a plurality of stacked unit cells each having the membrane-electrode assembly and the anode and cathode separation plates disposed on the respective opposite surfaces of the membrane-electrode assembly. The unit cells are coupled to each other by an appropriate compression force.

However, since the conventional PEMFC has a characteristic where a hydrogen ion conduction property thereof rises in proportion to an amount of moisture contained in the proton electrolyte membrane that is formed of a perfluorosulfonic acid-based material, the reactant gas, moisture of the proton electrolyte membrane, and heat must be properly controlled in order to obtain satisfactory performance thereof.

Particularly, when the PEMFC operates under a high load condition, the electrochemical reaction increases and thus the amount of moisture generated from the cathode side increases. This disturbs the supply of the reactant gas to the electrode. This phenomenon is referred to as "a flooding phenomenon". In addition, since the current density of the conventional PEMFC increases, the supply speed of the reactant gas is lower than the electrochemical reaction speed. This causes an increase of the concentration polarization phenomenon of the electrode.

Therefore, in order to solve the flooding phenomenon or the increase of the concentration polarization phenomenon, a method for reducing the reactant gas utilization rate has been usually used. That is, according to the method for reducing the reactant gas utilization rate, a flow rate of the reactant gas supplied to the fuel cell increases to increase the supply speed of the reactant gas to the electrode, thereby reducing the concentration polarization. In addition, in order to reduce the reactant gas utilization rate, a pressure difference between the inlet and outlet of the passage of the separator increases to improve the moisture removal capability from the passage, thereby improving the flooding phenomenon.

Nevertheless, in the above-described methods, an amount of the reactant gas supplied is excessively greater than an amount of the reactant gas that is required for the actual reaction. Therefore, since the fuel and oxidizing agent are excessively consumed, the efficiency of the stack is deteriorated or the consumption of power for operating a compressor supplying the reactant gas increases.

Therefore, in order to solve the flooding phenomenon and the concentration polarization phenomenon, a method for increasing a channel length and reducing the number of channels of the passage formed on the separator has also been used. However, this method has a problem in that pressure loss occurs unnecessarily at a low load region where both of the flooding phenomenon and the concentration polarization phenomenon do not occur.

DISCLOSURE

Technical Problem

The present invention has been made in an effort to solve the above-described problems of the prior art. An object of the present invention is to provide a fuel cell separator that can suppress a flooding phenomenon and a concentration polarization phenomenon by controlling the supply of reactant gas in accordance with an operation condition without excessive reactant gases, a fuel cell stack having the separator, and a reactant gas control method of the fuel cell stack.

Technical Solution

In one exemplary embodiment, a fuel cell separator for supplying reactant gases to a membrane-electrode assembly of a fuel cell stack includes reactant gas inlet through holes for introducing reactant gases, and reactant gas outlet though holes for discharging the reactant gases, wherein the reactant gas inlet through holes and the reactant gas outlet through holes are alternately formed along a first side edge of the fuel cell separator and one or more passages are formed on at least one of opposite surfaces of the fuel cell separator to connect the reactant gas inlet through holes to the respective reactant gas outlet through holes.

One of the reactant gases is an oxidizing gas, and a first oxidizing agent inlet through hole, a first oxidizing agent outlet through hole, a second oxidizing agent inlet through hole, and a second oxidizing agent outlet through hole are sequentially formed along an edge for the introduction and exhaust of the oxidizing gas.

The reactant gas passages are oxidizing agent passages, and the oxidizing agent passages are formed on one of the opposite surfaces to interconnect the oxidizing agent inlet through holes and the oxidizing agent outlet through holes such that a plurality of channels can be bent one time to form a U-shaped flow.

Alternatively, the reactant gas passages are oxidizing agent passages, and the oxidizing agent passages are formed on one of the opposite surfaces to interconnect the oxidizing agent inlet through holes and the oxidizing agent outlet through holes such that a plurality of channels can be bent at least two times to form a meander-shaped flow.

The other reactant gas is a fuel gas, and a first fuel inlet through hole, a first fuel outlet through hole, a second fuel inlet through hole, and a second fuel outlet through hole are sequentially formed along an edge for the introduction and exhaust of the fuel gas.

The reactant gas passages are fuel passages, and the fuel passages are formed on one of the opposite surfaces to interconnect the fuel inlet through holes and the fuel outlet through holes such that a plurality of channels can be bent one time to form a U-shaped flow.

Alternatively, the reactant gas passages are fuel passages, and the fuel passages are formed on one of the opposite surfaces to interconnect the fuel inlet through holes and the fuel outlet through holes such that a plurality of channels can be bent at least two times to form a meander-shaped flow.

In another exemplary embodiment, a fuel cell stack includes: a plurality of unit cells stacked with one another and each including a membrane-electrode assembly and a pair of separation plates; and end plates that are integrally coupled to opposite ends of the stacked unit cells by coupling members, respectively. The end plates are provided with reactant gas inlet ports supplying reactant gases and corresponding to the reactant gas inlet through holes, and reactant gas outlet ports discharging residual reactant gases and reaction by-product and corresponding to the reactant gas inlet through holes, the reactant gas inlet ports and the reactant gas outlet ports being alternately formed. The end plates include valves, which are installed on pipes connecting the reactant gas inlet ports to the reactant gas outlet ports to control reactant gas flow.

One of the reactant gases is an oxidizing gas, and the end plates include a first end plate coupled to one end of the stacked unit cells. The reactant gas inlet ports are first and second oxidizing agent inlet ports for supplying the oxidizing gas, and the reactant gas outlet ports are first and second oxidizing agent outlet ports for discharging residual oxidizing gas and reaction by-product.

One of the valves is an oxidizing agent inlet valve, which is installed on a pipe interconnecting the first and second oxidizing agent inlet ports to control flow of the oxidizing gas.

One of the valves is an oxidizing agent outlet valve, which is installed on a pipe interconnecting the first and second oxidizing agent outlet ports to control flow of the oxidizing gas.

The end plates further include a second end plate coupled to the other end of the stacked unit cells. The reactant gas inlet ports further include a third oxidizing agent inlet port sharing a manifold with the second oxidizing agent inlet port, and the reactant gas outlet ports further include a third oxidizing agent outlet port sharing a manifold with the first oxidizing agent outlet port.

The valves further include an oxidizing agent intermediate valve, which is installed on a pipe interconnecting the third oxidizing inlet and outlet ports to control oxidizing gas flow.

One of the reactant gases is a fuel gas, and the end plates include a first end plate coupled to one end of the stacked unit cells. The reactant gas inlet ports are first and second fuel inlet ports for supplying the fuel gas and the reactant gas outlet ports are first and second fuel outlet ports for discharging residual fuel gas.

One of the valves is a fuel inlet valve, which is installed on a pipe interconnecting the first and second fuel inlet ports to control flow of the fuel gas.

One of the valves is a fuel outlet valve, which is installed on a pipe interconnecting the first and second fuel outlet ports to control flow of the fuel gas.

The end plates further include a second end plate coupled to the other end of the stacked unit cells. The reactant gas inlet ports further include a third fuel inlet port sharing a manifold with the second fuel inlet port, and the reactant gas outlet ports further include a third fuel outlet port sharing a manifold with the first fuel outlet port.

The valves further include a fuel intermediate valve, which is installed on a pipe interconnecting the third fuel inlet and outlet ports to control fuel gas flow.

In still another exemplary embodiment, a method of controlling reactant gas of the fuel cell stack includes determining if a performance deterioration cause, such as a flooding phenomenon or concentration polarization phenomenon, occurs in the fuel cell stack. The method further includes controlling, when it is determined that the performance deterioration cause does not occur in the fuel cell stack, a reactant gas supply to the fuel cell stack in accordance with a low load operation condition, and, when it is determined that the performance deterioration cause occurs in the fuel cell stack, the reactant gas supply to the fuel cell stack in accordance with a high load operation condition. In the low load operation condition, the reactant gas inlet valve and the reactant gas outlet valve are opened and the reactant gas intermediate valve is closed so that the reactant gas is supplied through the first and second reactant gas inlet ports and discharged through the first and second reactant gas outlet ports. In the high load operation condition, the reactant gas inlet valve and the reactant gas outlet valve are closed and the reactant gas intermediate valve is opened so that the reactant gas is supplied only through the first reactant gas inlet port and discharged only through the second reactant gas outlet port.

The reactant gas flow is an oxidizing gas flow. In the low load operation condition, the oxidizing gas is supplied through the first and second oxidizing agent inlet ports. Then, the oxidizing gas passes along an oxidizing agent inlet manifold formed by the stack unit cells, in the course of which the oxidizing gas is introduced into the oxidizing agent passages through the first and second oxidizing agent inlet through holes. Next, the oxidizing gas is used for an electrochemical reaction, after which the oxidizing gas is discharged to the oxidizing agent outlet manifolds through the first and second oxidizing agent outlet through holes to be finally discharged to an external side through the first and second oxidizing agent outlet ports.

In the high load operation condition, the oxidizing gas is supplied only to the first oxidizing agent inlet port. Then, the oxidizing gas passes along the oxidizing agent inlet manifold formed by the stacked unit cells, in the course of which the oxidizing gas is introduced into the first oxidizing agent passage through the first oxidizing agent inlet through hole. Next, the oxidizing gas is used for the electrochemical reaction, after which the oxidizing gas is directed to the third oxidizing agent outlet port through the first oxidizing agent outlet manifold and the first oxidizing agent outlet through hole, and introduced again to the second oxidizing agent inlet manifold through the third oxidizing agent inlet port. Next, the oxidizing gas is introduced into the second oxidizing agent passage through the second oxidizing inlet through hole of the fuel cell separator. The oxidizing gas is used again for the electrochemical reaction, discharged to the second oxidizing agent outlet manifold through the second oxidizing agent outlet through hole, directed to the second oxidizing agent outlet port, and finally discharged to the external side through the second oxidizing agent outlet port.

The reactant gas flow is a fuel gas flow. In the low load operation condition, the fuel gas is supplied through the first and second fuel inlet ports. Then, the fuel gas passes along a fuel inlet manifold formed by the stacked unit cells, in the course of which the fuel gas is introduced into the fuel passages through the first and second fuel agent inlet through holes. Next, the fuel gas is used for an electrochemical reaction, after which the fuel gas is discharged to the fuel outlet manifolds through the first and second fuel outlet through holes to be finally discharged to an external side through the first and second fuel outlet ports.

In the high load operation condition, the fuel gas is supplied only to the first fuel inlet port. The fuel gas passes along the first fuel inlet manifold formed by the stacked unit cells, in the course of which the fuel gas is introduced into the first fuel passage through the first fuel inlet through hole. Next, the fuel gas is used for the electrochemical reaction, after which the fuel gas is discharged to the first fuel outlet manifold through the first fuel outlet through hole, directed to the third fuel outlet port, and introduced again to the second fuel inlet manifold through the third fuel inlet port. After the above, the fuel gas is introduced into the second fuel passage through the second fuel inlet through hole of the fuel cell separator. Next, the fuel gas is used again for the electrochemical reaction, discharged to the second fuel outlet manifold through the second fuel outlet through hole, and finally discharged to the external side through the second fuel outlet port.

Advantageous Effects

According to the present invention, by controlling the reactant gas supply in accordance with an operation condition of the fuel cell stack without experiencing pressure loss and deterioration of the utilizing rate, the flooding phenomenon and concentration polarization phenomenon that occur in the fuel cell stack can be prevented.

DESCRIPTION OF REFERENCE NUMERALS INDICATING PRIMARY ELEMENTS IN THE DRAWINGS

100, 101, 102, 104, 105: Separation Plate
200: Fuel Cell Stack
210: Unit cell
220, 230: End Plate
221, 223, 231: Oxidizing Inlet Port
222, 224, 232: Oxidizing Outlet Port
225: Oxidizing Agent Inlet Valve
226: Oxidizing Agent Outlet Valve
235: Oxidizing Agent Intermediate Valve
251, 253, 261: Fuel Inlet Port
252, 254, 262: Fuel Outlet Port
255: Fuel Inlet Value
256: Fuel Outlet Valve
265: Fuel Intermediate Value

BEST MODE

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
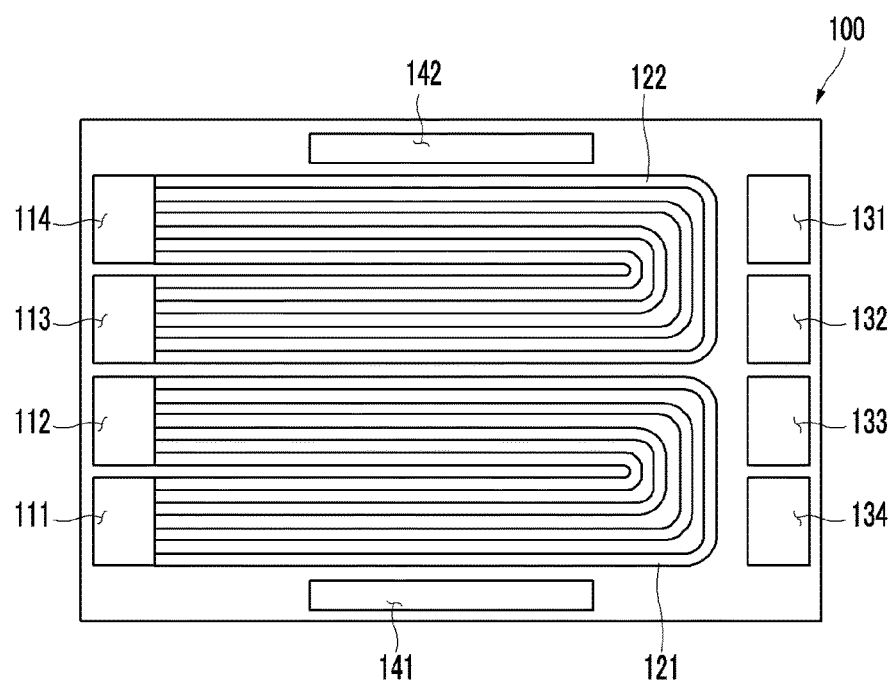
FIG. 1 is a front view of a fuel cell separator according to a first exemplary embodiment of the present invention.

FIG. 1 is a front view of a fuel cell separator according to a first exemplary embodiment of the present invention.

The fuel cell separator of the first exemplary embodiment may be divided into a cathode separation plate and an anode separation plate in accordance with a reactant gas. However, the cathode and anode separation plates have the following identical features. As shown in FIG. 1, a cathode separation plate 100 is provided with a first oxidizing agent inlet through hole 111, a first oxidizing agent outlet through hole 112, a second oxidizing agent inlet through hole 113, and a second oxidizing agent outlet rough hole 114. The first oxidizing agent inlet through hole 111, the first oxidizing agent outlet through hole 112, the second oxidizing agent inlet through hole 113, and the second oxidizing agent outlet through hole 114 are formed along a first side edge of the cathode separation plate 100 to allow the oxidizing agent to be introduced and discharged. A first oxidizing agent passage 121 is formed on a first surface of the cathode separation plate 100 to connect the first oxidizing agent inlet through hole 111 to the first oxidizing agent outlet through hole 112 such that a plurality of channels can be bent one time to form a U-shaped flow. A second oxidizing agent passage 122 is formed on the cathode separation plate 100 to connect the second oxidizing agent inlet through hole 113 to the second oxidizing agent outlet through hole 114 such that a plurality of channels can be bent one time to form a U-shaped flow.

The first oxidizing agent inlet through hole 111, the first oxidizing agent outlet through hole 112, the second oxidizing agent inlet through hole 113, and the second oxidizing agent outlet through hole 114 are formed along the first side edge of the cathode separation plate 100. The cathode separation plate 100 is provided with a first fuel inlet through hole 131, a first fuel outlet through hole 132, a second fuel inlet through hole 133, and a second fuel outlet through hole 134. The first fuel inlet through hole 131, the first fuel outlet through hole 132, the second fuel inlet through hole 133, and the second fuel outlet through hole 134 are formed along a second side edge of the cathode separation plate 100, which is opposite to the first side, to allow the fuel to be introduced and discharged. At this point, the first fuel inlet through hole 131 is disposed not to face the first oxidizing agent inlet through hole 111 but rather is diagonally disposed with respect to the first oxidizing agent inlet through hole 111. However, the present invention is not limited to this configuration. That is, the first fuel inlet through hole 131 may be disposed to face the first oxidizing agent inlet through hole 111.

A first fuel passage is formed on a first surface of the anode separation plate to connect the first fuel inlet through hole 131 to the first fuel outlet through hole 132 such that a plurality of channels can be bent one time to form a U-shaped flow of the fuel. A second fuel passage is formed on the anode separation plate to connect the second fuel inlet through hole 133 to the second fuel outlet through hole 134 such that a plurality of channels can be bent one time to form a U-shaped flow of the fuel.

The cathode separation plate 100 and the anode separation plate are provided with a coolant inlet through hole 141 and a coolant outlet through hole 142. The coolant inlet and outlet through holes 141 and 142 are respectively formed on opposite edges on which the oxidizing inlet through holes 111 and 113, the oxidizing outlet through holes 112 and 114, the fuel inlet through holes 131 and 133, and the fuel outlet through holes 132 and 134 are not formed. The coolant inlet through hole 141 and the coolant outlet through hole 142 are interconnected by a coolant passage formed on second surface of the fuel cell separator.

Further, the cathode separation plate 100 may be assembled with the anode separation plate such that the coolant passage forming surface of the cathode separation plate 100 faces the coolant passage forming surface of the anode separation plate. Alternatively, the cathode separation plate 100 may be assembled with the anode separation plate such that the coolant passage forming surface of the cathode separation plate 100 faces a surface of the anode separation plate, on which the coolant passage is not formed.

Although the cathode separation plate 100 and the anode separation plate are designed such that the oxidizing agent passages 121 and 122 and the fuel passages are formed to have U-shaped flows, the present invention is not limited to this configuration. That is, as shown in FIG. 2, each of the passages may be formed such that the plurality of channels are bent two or more times to form a meander-shaped flow.

The following will describe a fuel cell stack having the above-described fuel cell separator and a method of controlling a reactant gas (oxidizing gas and fuel gas) used in the fuel cell stack.

Figure 2:
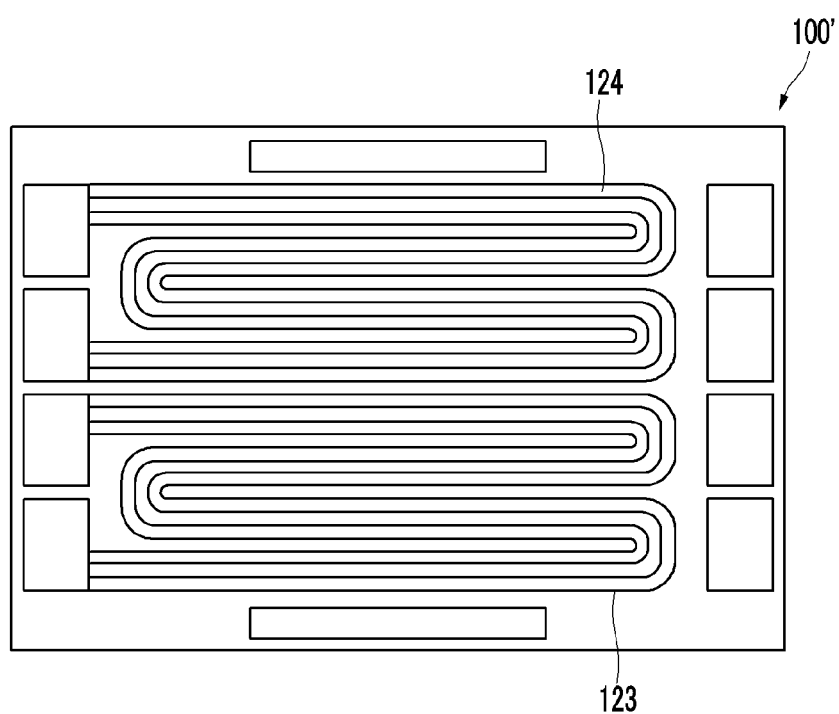
FIG. 2 is a front view of a fuel cell separator according to a second exemplary embodiment of the present invention.
Figure 3:
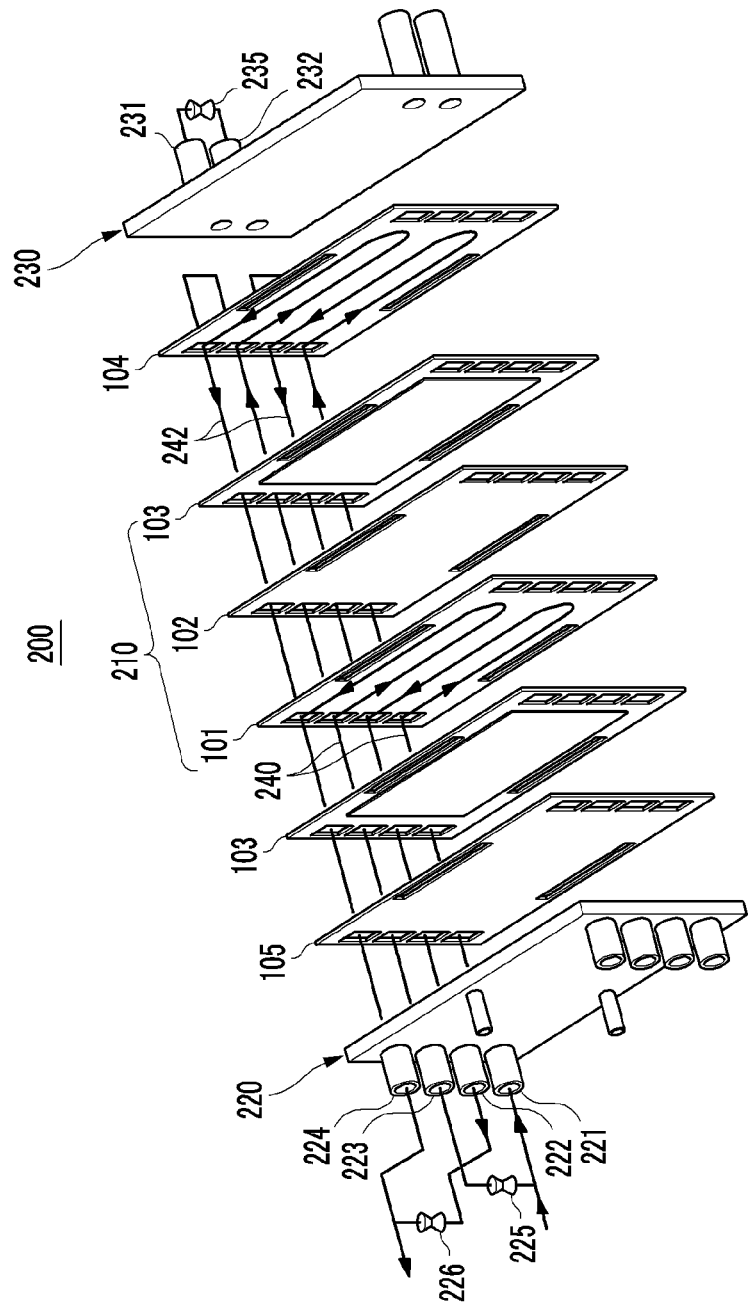
FIG. 3 is an exploded perspective view of a fuel cell stack having the fuel cell separator of FIG. 1 or FIG. 2 according to an exemplary embodiment of the present invention, illustrating oxidizing gas flow in a low load operation.

FIG. 3 is an exploded perspective view of a fuel cell stack having the fuel cell separator of FIG. 1 or FIG. 2 according to an exemplary embodiment of the present invention, illustrating oxidizing gas flow in a low load operation.

As shown in FIG. 3, a fuel cell stack 200 of the present exemplary embodiment uses the fuel cell separator having the cathode separation plate 100 and the anode separation plate. That is, the fuel cell stack 200 includes a plurality of unit cells 210 (only one is shown in FIG. 3) stacked with one another. Each of the unit cells 210 includes a fuel cell separator having a cathode separation plate 101 and an anode separation plate 102, and a membrane-electrode assembly 103. At this point, separation plates that are located on outermost ends of the stacked unit cells 210 will be referred to as a longitudinal end cathode separation plate 104 and a longitudinal end anode separation plate 105, respectively. Since the longitudinal anode and cathode separation plates 105 and 104 contact respectively first and second end plates 220 and 230, inner surfaces of the longitudinal cathode and anode separation plates 104 and 105 are provided with an oxidizing agent passage or a fuel passage and outer surfaces are not provided with any passage. The first and second end plates 220 and 230 are located on opposite ends of a body formed by the stacked unit cells 210 and are integrally coupled to the body by coupling members (not shown).

The first end plate 220 is provided with first and second oxidizing agent inlet ports 221 and 223 for supplying the oxidizing gas, and first and second oxidizing agent outlet ports 222 and 224 for discharging residual oxidizing gas that is not used for the electrochemical reaction and reaction by-product. A first pipe for interconnecting the first and second oxidizing agent inlet ports 221 and 223 is installed on the first end plate 220, and an oxidizing agent inlet valve 225 for selectively checking the gas flow at a portion near a front end of the second oxidizing agent inlet port 223 is installed on the first pipe. Further, a second pipe for interconnecting the first and second oxidizing agent outlet ports 222 and 224 is installed on the first end plate 220, and an oxidizing agent outlet valve 226 for selectively checking the gas flow at a portion near a front end of the second oxidizing agent outlet port 222 is installed on the second pipe.

The second end plate 230 is further provided with a third oxidizing inlet port 231 sharing a manifold with the second oxidizing agent inlet port 223 and a third oxidizing agent outlet port 232 sharing a manifold with the first oxidizing agent outlet port 222. Further, a third pipe for interconnecting the third oxidizing agent inlet and outlet ports 231 and 232 is installed on the second end plate 230, and an oxidizing agent intermediate valve 235 for selectively checking the gas flow at a portion near a front end of the third oxidizing agent inlet port 231 is installed on the third pipe.

The flow of the oxidizing gas in the low load operation of the fuel cell stack 200 is controlled by the following process. In the low load operation condition of the fuel cell stack 200, the oxidizing agent inlet valve 225 and the oxidizing agent outlet valve 226 are opened and the oxidizing agent intermediate valve 235 is closed.

Then, as shown in FIGS. 1 and 3, the oxidizing gas is uniformly supplied to the first and second oxidizing agent inlet ports 221 and 223. The oxidizing gas passes through an oxidizing agent inlet manifold 240 formed by stacking the unit cells 210, in the course of which the oxidizing gas is introduced into the oxidizing agent passages 121 and 122 through the respective first and second oxidizing agent inlet through holes 111 and 113. The oxidizing gas is used for the electrochemical reaction, after which it is discharged to the oxidizing agent outlet manifold 242 through the first and second oxidizing agent outlet through holes 112 and 114. At this point, since the oxidizing agent intermediate valve 235 is closed, the oxidizing gas is discharged to an external side through the first and second oxidizing agent outlet ports 222 and 224.

Figure 4:
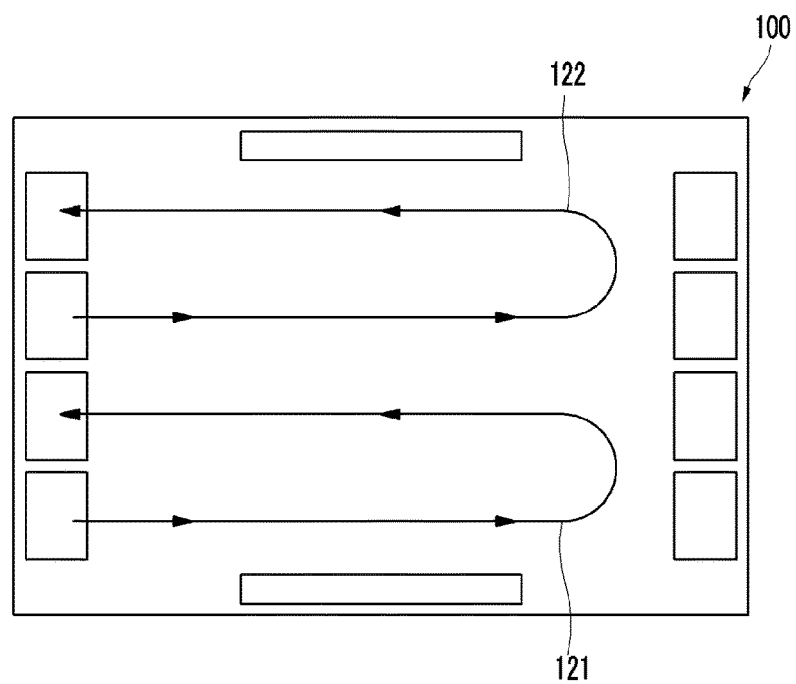
FIG. 4 is a schematic diagram illustrating oxidizing gas flow in the fuel cell separator of FIG. 3 in a low load operation.

That is, even when the fuel cell stack 200 operates under the low load operation condition, as shown in FIG. 4, the oxidizing gas is supplied to the oxidizing agent passages 121 and 122 of the cathode separation plate 100, and thus, the length of the passage can be shortened by 50% as compared with the prior art having only one oxidizing agent passage. Therefore, the reactant gas can be effectively supplied without experiencing pressure loss.

Figure 5:
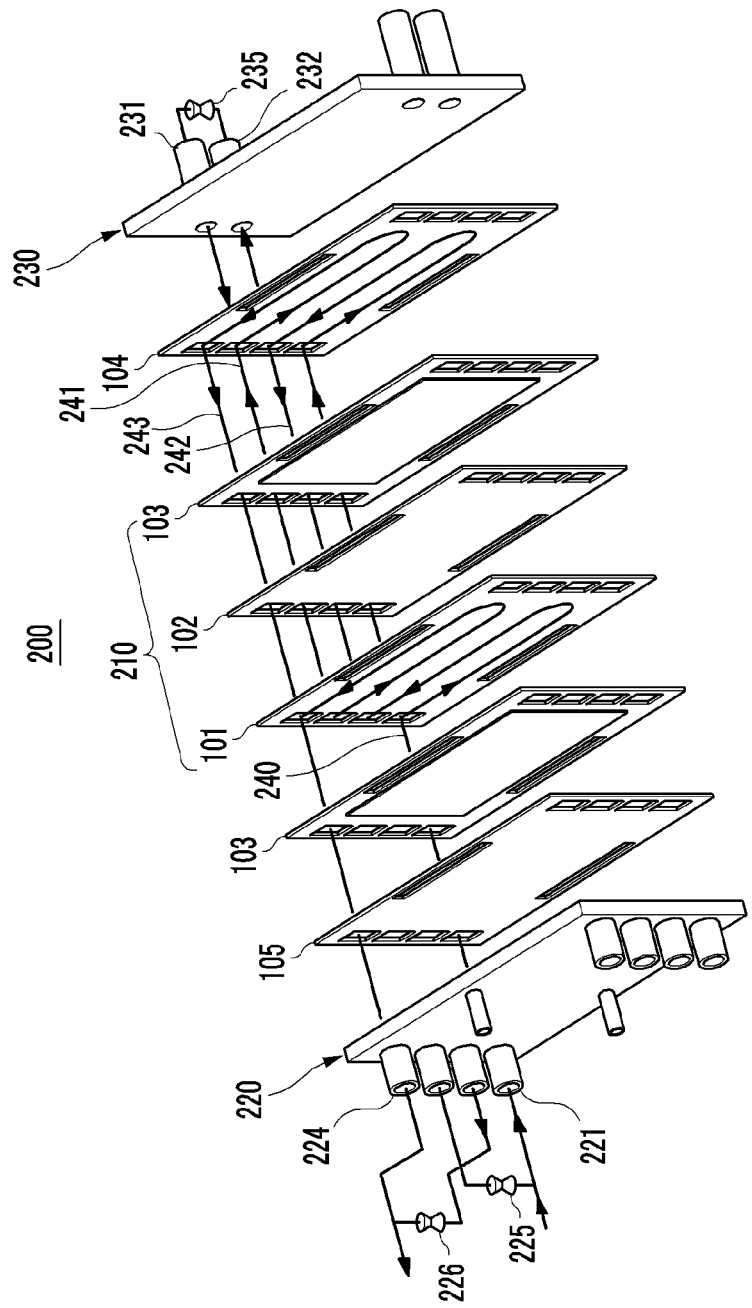
FIG. 5 is an exploded perspective view of the fuel cell stack of FIG. 3, illustrating oxidizing gas flow in a high load operation.

FIG. 5 is an exploded perspective view of the fuel cell stack of FIG. 3, illustrating oxidizing gas flow in a high load operation.

In a high load operation of a conventional fuel cell stack, since a current density is high, the flooding phenomenon may occur and the concentration polarization increases. To solve this problem, the flow rate and pressure in the passages should be significantly increased by reducing the reactant gas utilizing rate. However, in the present exemplary embodiment, the oxidizing gas flow can be controlled by the following process without lowering the reactant gas utilizing rate in the high load operation and employing a separation plate only for the high load operation.

That is, as shown in FIGS. 1 and 5, in a high load operation condition, the oxidizing agent inlet and outlet valves 225 and 226 are closed and the oxidizing agent intermediate valve 235 is opened.

Then, the oxidizing gas is supplied through only the first oxidizing agent inlet port 221. The oxidizing gas passes through an oxidizing agent inlet manifold 240, in the course of which the oxidizing gas is introduced into the oxidizing agent passages 121 through the first oxidizing agent inlet through holes 111. The oxidizing gas is used for the electrochemical reaction, after which it is discharged to the oxidizing agent outlet manifold 242 through the first oxidizing agent outlet through holes 112 and subsequently directed to the third oxidizing agent outlet port 232. The oxidizing gas directed to the third oxidizing agent outlet port 232 is introduced into the second oxidizing agent inlet manifold 241 through the third oxidizing agent inlet port 231, after which it is directed to the second oxidizing agent passages 122 through the second oxidizing agent inlet through holes 113 of the cathode separation plates 100. Then, the oxidizing gas is used again for the electrochemical reaction, after which it is discharged to the second oxidizing agent outlet manifold 243 through the second oxidizing agent outlet through holes 114 and subsequently discharged to the external side through the second oxidizing agent outlet port 224.

Figure 6:
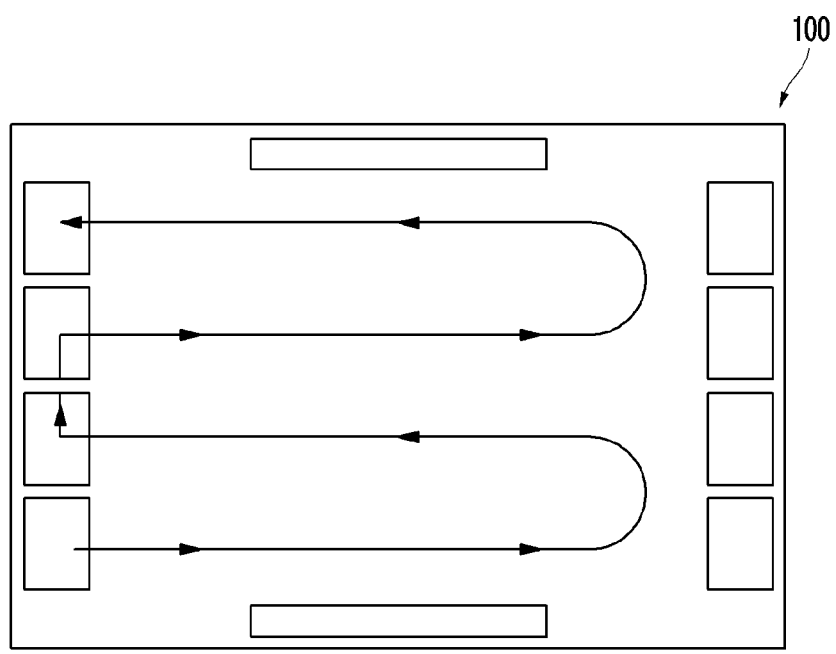
FIG. 6 is a schematic diagram illustrating oxidizing gas flow in the fuel cell separator of FIG. 3 in a high load operation.

As described above, in the high load operation of the fuel cell stack 200, as shown in FIG. 6, the oxidizing gas is introduced into the first oxidizing agent passage 121 of the cathode separation plate 100 and utilized in half of the whole electrode area. Subsequently, the oxidizing gas is introduced into the second oxidizing passage 122 and utilized in the remaining half of the electrode area. Further, in the high load operation of the fuel cell stack 200, since the oxidizing gas is supplied through only one oxidizing agent inlet port, the flow rate of the oxidizing gas flowing along the passage channels is increased by two times, even when the reactant gas utilizing rate is identical as compared with the oxidizing gas flow in the low load operation of FIG. 3. As a result, according to the fuel cell stack 200 of the present exemplary embodiment, the moisture existing in the passage channels can be more effectively discharged and the flooding phenomenon occurring in the high load operation can be prevented. Further, according to the reactant gas 5 control method of the fuel cell stack 200, since the supply speed of the oxidizing gas to the passage channels in the high load operation is increased, an amount of the reactant gas supplied to the electrode increases and thus the concentration polarization phenomenon can be reduced.

As a result, the reactant gas control method of the fuel cell stack 200 controls the oxidizing gas flow using a method identical to that for the low load operation condition in a normal operation. Meanwhile, according to the reactant gas control method of the fuel cell stack 200, when the flooding phenomenon that causes the deterioration of the performance of the fuel cell stack occurs or the concentration polarization that also causes the deterioration of the performance of the fuel cell stack increases, the oxidizing gas flow changes to a gas flow for the high load operation condition. When the performance deterioration causes are solved, the oxidizing gas flow changes to a gas flow for the low load operation condition.

Figure 7:
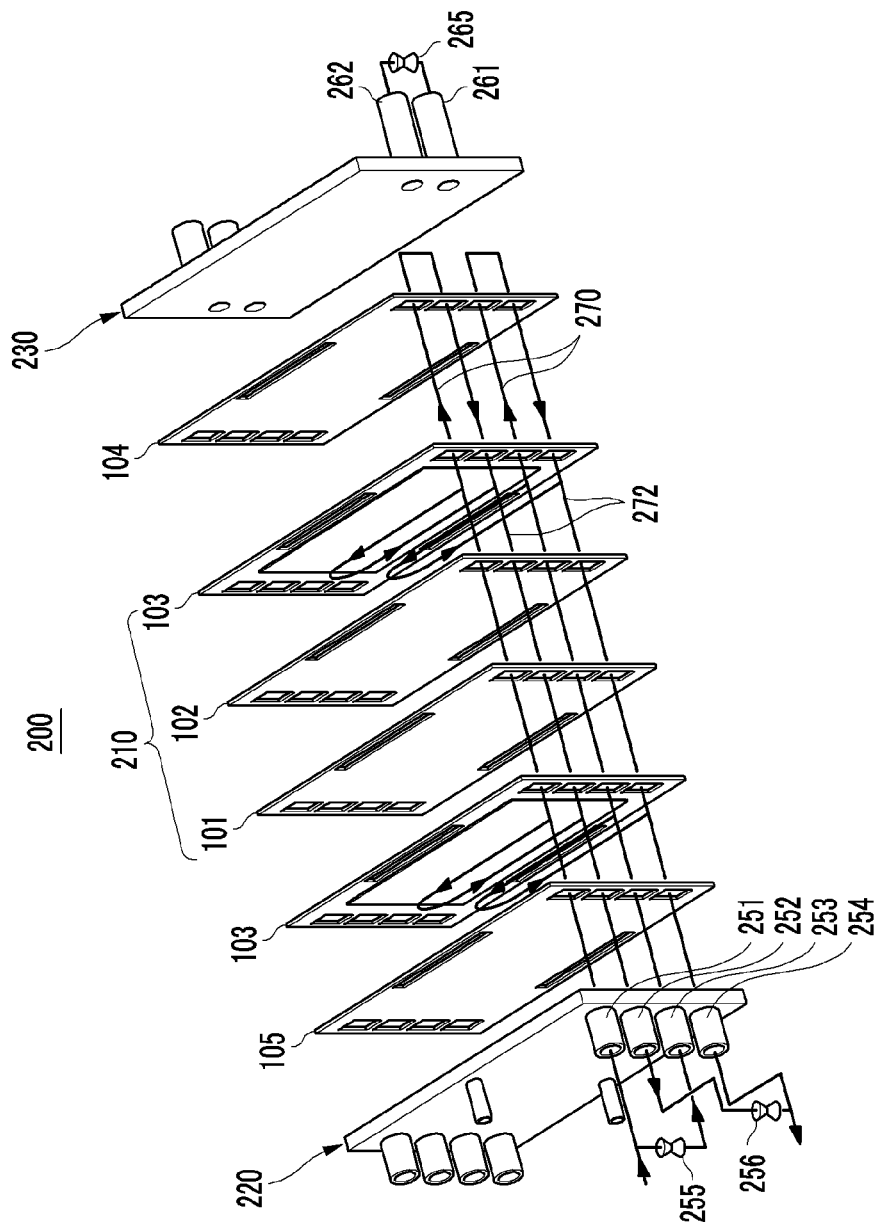
FIG. 7 is an exploded perspective view of the fuel cell stack of FIG. 3, illustrating fuel gas flow in a low load operation.

FIG. 7 is an exploded perspective view of the fuel cell stack of FIG. 3, illustrating fuel gas flow in a low load operation.

As shown in FIG. 7, the fuel cell stack 200 uses the fuel cell separator of FIG. 1 or FIG. 2 and further includes additional constituent elements that will be described hereinafter to utilize the fuel gas.

The first end plate 220 is provided with first and second fuel inlet ports 251 and 253 for supplying the fuel gas, and first and second fuel outlet ports 252 and 254 for discharging residual fuel gas that is not used for the electrochemical reaction. A fourth pipe for interconnecting the first and second fuel inlet ports 251 and 253 is installed on the first end plate 220, and a fuel inlet valve 255 for selectively checking the gas flow at a portion near a front end of the second fuel inlet port 253 is installed on the fourth pipe. Further, a fifth pipe for interconnecting the first and second fuel outlet ports 252 and 254 is installed on the first end plate 220, and a fuel outlet valve 256 for selectively checking the gas flow at a portion near a front end of the second fuel outlet port 252 is installed on the fifth pipe.

The second end plate 230 is further provided with a third fuel inlet port 261 sharing a manifold with the second fuel inlet port 253 and a third fuel outlet port 262 sharing a manifold with the first fuel outlet port 252. Further, a sixth pipe for interconnecting the third fuel inlet and outlet ports 261 and 262 is installed on the second end plate 230, and a fuel intermediate valve 265 for selectively checking the gas flow at a portion near a front end of the third fuel inlet port 261 is installed on the sixth pipe.

As described above, the constituent elements for utilizing the fuel gas are similar to those for utilizing the oxidizing gas.

Therefore, the fuel is uniformly supplied to the first and second fuel inlet ports 251 and 253. The fuel passes through a fuel inlet manifold 270, in the course of which the fuel gas is introduced into the fuel passages of the anode separation plates. Next, the fuel is used for the electrochemical reaction, after which it is discharged to the fuel outlet manifold 272. At this point, since the fuel intermediate valve 265 is closed, the fuel is subsequently discharged to the external side through the first and second fuel outlet ports 252 and 254.

In the fuel cell stack 200, the oxidizing agent inlet through holes 111 and 113 and the oxidizing agent outlet through holes 112 and 114 are oppositely located with respect to the fuel inlet through holes 131 and 133 and the fuel outlet through holes 132 and 134. However, although the fuel gas flow and the oxidizing gas flow are different in a vertical location from each other, the operation control methods thereof are identical to each other.

Figure 8:
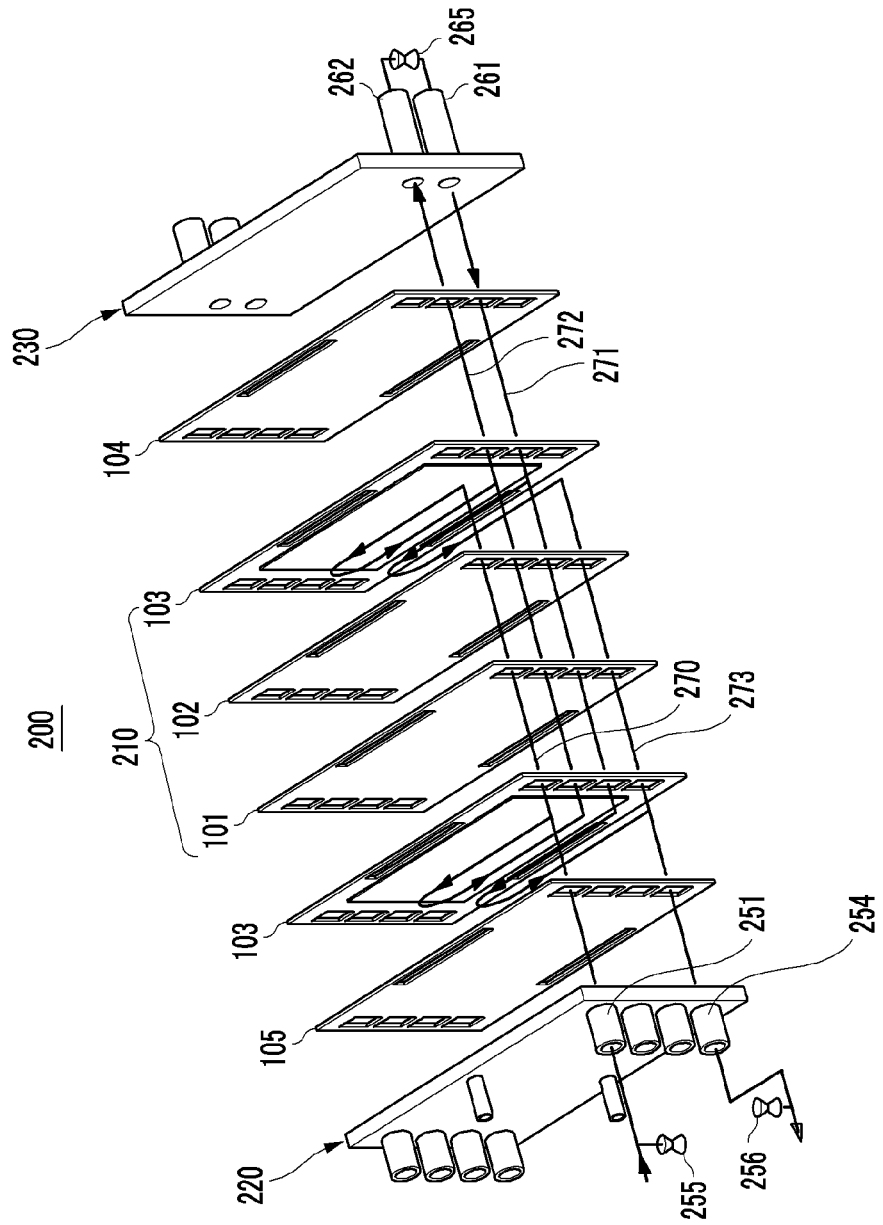
FIG. 8 is an exploded perspective view of the fuel cell stack of FIG. 3, illustrating fuel gas flow in a high load operation.

FIG. 8 is an exploded perspective view of the fuel cell stack of FIG. 3, illustrating fuel gas flow in a high load operation.

As shown in FIGS. 1 and 8, the fuel gas is supplied through only the first fuel inlet port 251. The fuel gas passes through the fuel inlet manifold 270, in the course of which the fuel gas is introduced into the fuel passages through the first fuel inlet through holes 131. The fuel is used for the electrochemical reaction, after which it is discharged to the fuel outlet manifold 272 through the first fuel outlet through holes 132 and subsequently directed to the third fuel outlet port 262. The fuel directed to the third fuel outlet port 262 is introduced into the second fuel inlet manifold 271 through the third fuel inlet port 261, after which it is directed to the second fuel passages through the second fuel inlet through holes 133. Then, the fuel gas is used again for the electrochemical reaction, after which it is discharged to the second fuel outlet manifold 273 through the second fuel outlet through holes 134 and subsequently discharged to the external side through the second fuel outlet port 254.

As described above, the method for controlling the oxidizing gas flow is identically applied to the method for controlling the fuel gas flow.

Figure 9:
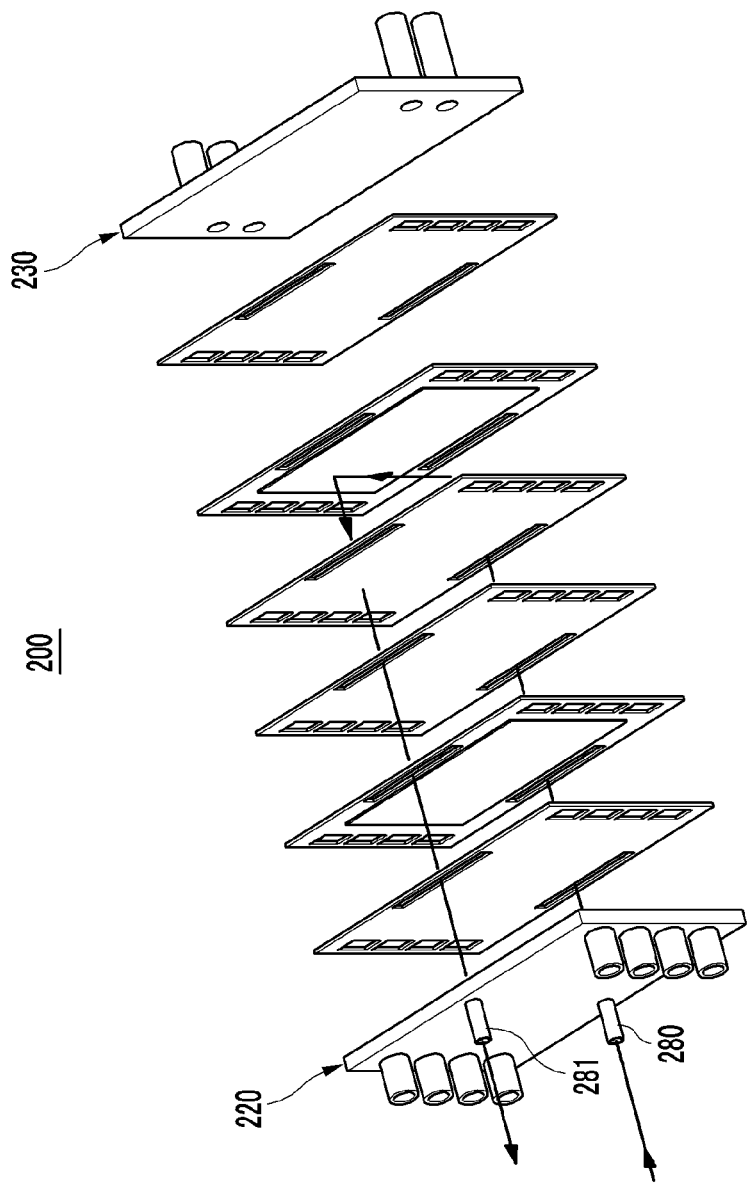
FIG. 9 is an exploded perspective view of the fuel cell stack of FIG. 3, illustrating coolant flow.

FIG. 9 is an exploded perspective view of the fuel cell stack of FIG. 3, illustrating coolant flow.

As shown in FIGS. 1 and 9, one of the first and second end plates 220 and 230 (the first end plate 220 in the drawing) is provided with a coolant inlet port 280 for supplying a coolant and a coolant outlet port 281 for discharging the coolant. Then, the coolant is introduced into the fuel cell stack 200 through the coolant inlet port 280 and flows along the coolant passage through the coolant inlet through holes 141 formed in the fuel cell separators to cool the fuel cell stack 200, after which it is discharged to the external side through the coolant outlet port 281. At this point, the coolant flows in the fuel cell separators in a direction in which the oxidizing gas flows. That is, if the oxidizing gas flows upward, the coolant may also flow upward.

As described above, the fuel cell separator of the present exemplary embodiment is provided with a pair of the oxidizing agent passages 121 and 122 and a pair of the fuel passages to charge respective divided regions of the whole electrode area. However, the present invention is not limited to this configuration. That is, two or more pairs of the oxidizing agent passages and two or more pairs of the fuel passages may be formed. In this case, additional constituent elements for supplying and discharging the oxidizing gas and fuel gas to and from the fuel cell separator may be further provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel cell separator for supplying reactant gas to a membrane-electrode assembly of a fuel cell stack, the fuel cell separator comprising:
reactant gas inlet through holes for introducing reactant gases;
reactant gas outlet though holes for discharging the reactant gases; and
a coolant inlet through hole for introducing a coolant; and
a coolant outlet through hole for discharging the coolant,
wherein the reactant gas inlet through holes and the reactant gas outlet through holes are alternately formed along an edge of the fuel cell separator and one or more passages are formed on at least one of opposite surfaces of the fuel cell separator to connect the reactant gas inlet through holes to the respective reactant gas outlet through holes, wherein one of the reactant gases is an oxidizing gas, and a first oxidizing agent inlet through hole, a first oxidizing agent outlet through hole, a second oxidizing agent inlet through hole, and a second oxidizing agent outlet through hole are sequentially formed along a first side edge of the fuel cell separator, for an introduction and exhaust of the oxidizing gas, wherein one of the reactant gases is a fuel gas, and a first fuel inlet through hole, a first fuel outlet through hole, a second fuel inlet through hole, and a second fuel outlet through hole are sequentially formed along a second side edge of the fuel cell separator, which is opposite to the first side edge, for an introduction and exhaust of the fuel gas, wherein the coolant inlet through hole and the coolant outlet through hole are respectively formed on opposite edges of the full cell separator on which the reactant gas inlet through holes and the reactant gas outlet though holes are not formed, and wherein the coolant flows in a direction in which the oxidizing gas flows.

2. The fuel cell separator of claim 1, wherein the reactant gas passages are oxidizing agent passages, and the oxidizing agent passages are formed on one of the opposite surfaces to interconnect the oxidizing agent inlet through holes and the oxidizing agent outlet through holes such that a plurality of channels can be bent one time to form a U-shaped flow.

3. The fuel cell separator of claim 1, wherein the reactant gas passages are oxidizing agent passages, and the oxidizing agent passages are formed on one of the opposite surfaces to interconnect the oxidizing agent inlet through holes and the oxidizing agent outlet through holes such that a plurality of channels can be bent at least two times to form a meander-shaped flow.

4. The fuel cell separator of claim 1, wherein the reactant gas passages are fuel passages, and the fuel passages are formed on one of the opposite surfaces to interconnect the fuel inlet through holes and the fuel outlet through holes such that a plurality of channels can be bent one time to form a U-shaped flow.

5. The fuel cell separator of claim 1, wherein the reactant gas passages are fuel passages, and the fuel passages are formed on one of the opposite surfaces to interconnect the fuel inlet through holes and the fuel outlet through holes such that a plurality of channels can be bent at least two times to form a meander-shaped flow.

* * * * *